US008611239B2

(12) United States Patent
Madan et al.

(10) Patent No.: US 8,611,239 B2
(45) Date of Patent: Dec. 17, 2013

(54) DISTRIBUTED COMPUTATION OF COMMON NORMALIZATION CONSTANT FOR QUANTIZED BEST EFFORT TRAFFIC PRIORITY

(75) Inventors: Ritesh K. Madan, Jersey City, NJ (US); Ashwin Sampath, Skillman, NJ (US); Aamod Dinkar Khandekar, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 608 days.

(21) Appl. No.: 12/784,347

(22) Filed: May 20, 2010

(65) Prior Publication Data
US 2011/0128870 A1 Jun. 2, 2011

Related U.S. Application Data

(60) Provisional application No. 61/180,730, filed on May 22, 2009.

(51) Int. Cl.
*H04L 1/00* (2006.01)

(52) U.S. Cl.
USPC .................. 370/252; 370/230; 370/231

(58) Field of Classification Search
USPC ............ 370/352; 455/461, 414, 417; 709/206
See application file for complete search history.

(56) References Cited

U.S. PATENT DOCUMENTS

| 7,668,518 | B2* | 2/2010 | Chen | 455/166.2 |
| 7,738,375 | B1* | 6/2010 | Vinokour et al. | 370/232 |
| 7,860,002 | B2 | 12/2010 | Lee et al. | |
| 7,974,197 | B2 | 7/2011 | Chen et al. | |
| 2006/0268716 | A1* | 11/2006 | Wijting et al. | 370/235 |
| 2007/0127410 | A1* | 6/2007 | Guo et al. | 370/328 |
| 2009/0010258 | A1 | 1/2009 | Ayoub et al. | |
| 2009/0116439 | A1 | 5/2009 | Madan et al. | |
| 2009/0286482 | A1* | 11/2009 | Gorokhov et al. | 455/63.1 |
| 2010/0103834 | A1* | 4/2010 | Gorokhov et al. | 370/252 |

FOREIGN PATENT DOCUMENTS

WO    WO2008135101    11/2008

OTHER PUBLICATIONS

Hyung-Sub Kimeal: "Inter-cell Interference Coordination for Uplink Non-real-time Data in CDMA Systems" Advanced Communication Technology, 2008. ICACT 2008, Feb. 17, 2008, pp. 777-780, XP031245245 ISBN: 978-89-5519-136-3 p. 777-p. 778
International Search Report and Written Opinion—PCT/US2010/035868, International Search Authority—European Patent Office—Oct. 21, 2010.

(Continued)

*Primary Examiner* — Yemane Mesfin
*Assistant Examiner* — Derrick V Rose
(74) *Attorney, Agent, or Firm* — Michael J. DeHaemer, Jr.

(57) ABSTRACT

Apparatus, systems, devices and methods are provided for Distributed Computation of Common Normalization Constant for Quantized Best Effort Traffic Priority. In certain non-limiting aspects, there may be provided a method for prioritizing traffic in a wireless communication environment, including: providing a quantized priority value for each of one or more data streams associated with a wireless communications node; and determining a relative prioritization for each of the one or more data streams using the quantized priority values and one or more quantized priority values associated with one or more other wireless communications nodes; wherein, the quantized priority values associated with the wireless and other wireless communications nodes are normalized with respect to a reference rate.

34 Claims, 11 Drawing Sheets

(56) References Cited

OTHER PUBLICATIONS

Jaakko Vihriala: "Initial Report on System Aspects of FlexibleSpectrum Use" [Online] Jan. 20, 2009, pp. 1-63, XP002601995 Celtic Telecommunication Solutions Retrieved from the Internet:URL: http://projects.celtic-initiative.org/winner+/WINNER+%ZODelivrables/DI.2-vI.0.

Pischella M, et al., "Resource A1 location for QoS-Aware OFDMA Using Distributed Network Coordination" IEEE Transactions on Vehicular Technology, vol. 58, No. 4, May 1, 2009, pp. 1766-1775, XP011248169 ISSN: 0018-9545.

L. Xiao and S. Boyd, "Fast Linear Iterations for Distributed Averaging" Systems and Controls Letters, vol. 53, No. 1, p. 65-78, Sep. 2004, Elsevier.

* cited by examiner

DISTRIBUTED COMPUTATION OF COMMON NORMALIZATION CONSTANT FOR QUANTIZED BEST EFFORT TRAFFIC PRIORITY

CLAIM OF PRIORITY UNDER 35 U.S.C. §119

The present application for patent claims priority to Provisional Application No. 61/180,730 entitled "DISTRIBUTED COMPUTATION OF COMMON NORMALIZATION CONSTANT FOR QUANTIZED BEST EFFORT TRAFFIC PRIORITY," filed May 22, 2009, which is assigned to the assignee hereof, and is hereby expressly incorporated in its entirety by reference herein.

BACKGROUND

1. Field

The following description relates generally to wireless communications, and more particularly to distributed dynamic interference management in wireless networks.

2. Background

Wireless communication systems are widely deployed to provide various types of communication content such as voice, data, and so on. These systems may be multiple-access systems capable of supporting communication with multiple users by sharing available system resources (e.g., bandwidth and transmit power). Examples of such multiple-access systems include code division multiple access (CDMA) systems, time division multiple access (TDMA) systems, frequency division multiple access (FDMA) systems, 3GPP Long Term Evolution (LTE) systems, and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. A communication link may be established via a single-in-single-out, multiple-in-signal-out or a multiple-in-multiple-out (MIMO) system.

A MIMO system employs multiple (NT) transmit antennas and multiple (NR) receive antennas for data transmission. A MIMO channel formed by the NT transmit and NR receive antennas may be decomposed into NS independent channels, which are also referred to as spatial channels, where $N_S \leq \min\{N_T, N_R\}$. Each of the NS independent channels corresponds to a dimension. A MIMO system can provide improved performance (e.g., higher throughput and/or greater reliability) if the additional dimensionalities created by the multiple transmit and receive antennas are utilized.

A MIMO system may support time division duplex (TDD) and frequency division duplex (FDD) systems. In a TDD system, the forward and reverse link transmissions are on the same frequency region so that the reciprocity principle allows the estimation of the forward link channel from the reverse link channel. This enables the access point to extract transmit beamforming gain on the forward link when multiple antennas are available at the access point.

With the advent of different kinds of wireless communication systems that facilitate varied communications, bandwidth demands as well as user volume has increased. Wireless communication systems can range from outdoor cellular towers that service thousands of subscribers to indoor Femto access points, which are building based wireless access points that facilitate communications for a few users. Accordingly, information may be transmitted at different rates depending on particular requirements which can vary from network to network. Further, volumes of users, multipath etc. are all causes for interference within communication systems. Moreover, systems such as Femto networks may be unplanned and operate in a close subscriber group (CSG) mode since only a few (or just one) mobiles or user equipment (UE) may be connected to a Femto base station. Thus, it may be advantageous to facilitate scheduling and resource allocation across cells in a coordinated manner.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In accordance with one or more aspects of the present invention, there may be provided a method for prioritizing traffic in a wireless communication environment, comprising: providing a quantized priority value for each of one or more data streams associated with a wireless communications node; and determining a relative prioritization for each of the one or more data streams using the quantized priority values and one or more quantized priority values associated with one or more other wireless communications nodes; wherein, the quantized priority values associated with the wireless and other wireless communications nodes are normalized with respect to a reference rate.

The one or more data streams may be best efforts-type data streams. The one or more data streams may be best efforts-type data streams amongst other types of data streams. The providing the quantized priority value may comprise determining the reference rate. The providing the quantized priority value may further comprise determining a priority value based upon the determined rate and at least one parameter associated with the associated data stream. The method may further include quantizing the determined priority value.

The determined rate may be at least partially based upon communications rates associated with prior data streams associated with the wireless communications node. The determined rate may be at least partially based upon an average of communications rates associated with prior data streams associated with the wireless communications node. The determined rate may be at least partially based upon an average of communications rates associated with prior data streams associated with the one or more other wireless communications nodes. The determined rate may be at least partially based upon an average of communications rates associated with prior data streams associated with the one or more other wireless communications nodes.

The providing the quantized priority value may comprise determining the reference rate, wherein the reference rate is associated with the wireless and other wireless communications nodes. The one or more quantized priority values associated with one or more other wireless communications nodes may be received. At least one of the received quantized priority values may be directly received from the corresponding other wireless communications node. At least one of the received quantized priority values may be received from the corresponding other wireless communications node via an air interface. At least one of the received quantized priority values may be received from the corresponding other wireless communications node via an S1 interface. At least one of the received quantized priority values may be received from the corresponding other wireless communications node via an X2 interface.

One or more of the wireless and other wireless communications nodes may be wireless access points. One or more of the wireless and other wireless communications nodes may be home evolved nodes.

The providing the quantized priority value may comprise: determining the reference rate; and determining at least one resource to meet one or more QoS parameters for non best-effort traffic associated with the wireless communications node. The determining the resource may comprise determining channel gains for the non-best effort traffic.

In accordance with one or more aspects of the present invention, there may be provided a wireless communications node, comprising at least one processor configured to: provide a quantized priority value for each of one or more data streams associated with the node; and determine a relative prioritization for each of the one or more data streams using the quantized priority values and one or more quantized priority values associated with one or more other wireless communications nodes; wherein, the quantized priority values associated with the wireless and other wireless communications nodes are normalized with respect to a reference rate.

The one or more data streams may be best efforts-type data streams amongst other types of data streams. The providing the quantized priority value may comprise determining the reference rate. The providing the quantized priority value may further comprise determining a priority value based upon the determined rate and at least one parameter associated with the associated data stream. The determined priority value may be quantized. The determined rate may be at least partially based upon communications rates associated with prior data streams associated with the wireless communications node.

The determined rate may be at least partially based upon an average of communications rates associated with prior data streams associated with the one or more other wireless communications nodes. The determined rate may be at least partially based upon an average of communications rates associated with prior data streams associated with the one or more other wireless communications nodes.

At least one of the received quantized priority values may be received, such as via an air interface, S1 interface and/or X2 interface.

The quantized priority value may include: determining the reference rate; and determining at least one resource to meet one or more QoS parameters for non best-effort traffic associated with the wireless communications node. The determining the resource may comprise determining channel gains for the non-best effort traffic.

In accordance with one or more aspects of the present invention, there may be provided a tangible computer-readable medium having instructions stored thereon, the instructions comprising: instructions for providing a quantized priority value for each of one or more data streams associated with a wireless communications node; and instructions for determining a relative prioritization for each of the one or more data streams using the quantized priority values and one or more quantized priority values associated with one or more other wireless communications nodes; wherein, the quantized priority values associated with the wireless and other wireless communications nodes are normalized with respect to a reference rate.

In accordance with one or more aspects of the present invention, there may be provided a method for prioritizing traffic in a wireless communication environment, comprising: transmitting at least one quantized priority value associated with a wireless communications node to at least one other wireless communications node; wherein: the quantized priority value is at least partially based upon one or more best-efforts-type traffic streams; and the quantized priority value is normalized with respect to a rate also associated with best-efforts-type traffic prioritization of at least one other wireless communications node.

The transmitted at least one quantized priority value may be associated with one or more best efforts-type data streams amongst other types of data streams. A rate to be associated with the wireless communications node may be determined. The rate determining may be at least partially based upon communications rates associated with prior data streams associated with the wireless communications node. The rate determining may be at least partially based upon an average of communications rates associated with prior data streams associated with the one or more other wireless communications nodes. The rate determining is at least partially based upon an average of communications rates associated with prior data streams associated with the one or more other wireless communications nodes.

The transmitting may comprise transmitting via an air, S1 and/or X2 interface.

In accordance with one or more aspects of the present invention, there may be provided a wireless communications node, comprising: at least one processor configured to transmit at least one quantized priority value associated with the wireless communications node to at least one other wireless communications node; wherein: the quantized priority value is at least partially based upon one or more best-efforts-type traffic streams; and the quantized priority value is normalized with respect to best-efforts-type traffic prioritization associated with the at least one other wireless communications node. The transmitted at least one quantized priority value may be associated with one or more best efforts-type data streams amongst other types of data streams.

The rate to be associated with the wireless communications node may be determined. The rate determining may be at least partially based upon communications rates associated with prior data streams associated with the wireless communications node. The rate determining may be at least partially based upon an average of communications rates associated with prior data streams associated with the one or more other wireless communications nodes. The rate determining may be at least partially based upon an average of communications rates associated with prior data streams associated with the one or more other wireless communications nodes.

The transmitting may comprise transmitting via an air, S1 and/or X2 interface.

In accordance with one or more aspects of the present invention, there may be provided a non-transitory computer-readable medium having instructions stored thereon, the instructions comprising: instructions for transmitting at least one quantized priority value associated with a wireless communications node to at least one other wireless communications node; wherein: the quantized priority value is at least partially based upon one or more best-efforts-type traffic streams; and the quantized priority value is normalized with respect to best-efforts-type traffic prioritization associated with the at least one other wireless communications node.

In accordance with one or more aspects of the present invention, there may be provided a method that facilitates prioritization of traffic in a wireless communication environment, comprising: determining a reference rate for prioritization of one or more traffic streams; comparing quantization levels of the one or more traffic streams with the reference rate; and setting priorities of the one or more traffic streams based at least on the comparison. The traffic streams may be best effort traffic streams.

The reference rate may be an intra-cell reference rate obtained from previous values of reference rates used in a cell serviced by a eNode B. The reference rate may be an inter-cell reference rate based on previous values of reference rates used in a cell and prior values of reference rates obtained from one or more other cells neighboring the cell.

The reference rate may be determined at least in part by determining one or more resources for non best-effort traffic within a cell for which the reference rate is determined. The determining one or more resources may comprise determining one or more channel gains associated with QoS requirements of the non-best effort traffic. Resources remaining for allocation to best effort flows based on the resources needed to meet QoS requirements of the non best-effort traffic may be determined. The reference rate may be stored for determination of future values of the reference rate.

In accordance with one or more aspects of the present invention, there may be provided a wireless communications apparatus, comprising: a memory that retains instructions related to determining a reference rate for prioritization of one or more traffic streams, and setting priorities of the one or more traffic streams based at least on a comparison of quantization levels of the one or more traffic streams with the determined reference rate; and a processor, coupled to the memory, configured to execute the instructions retained in the memory.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout and wherein.

DESCRIPTION

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), cdma2000, etc. UTRA includes Wideband-CDMA (W-CDMA) and Low Chip Rate (LCR). cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3rd Generation Partnership Project" (3GPP). cdma2000 is described in documents from an organization named "3rd Generation Partnership Project 2" (3GPP2). These various radio technologies and standards are known in the art. For clarity, certain aspects of the techniques are described below for LTE, and LTE terminology is used in much of the description below.

Single carrier frequency division multiple access (SC-FDMA), which utilizes single carrier modulation and frequency domain equalization is a technique. SC-FDMA has similar performance and essentially the same overall complexity as those of OFDMA system. SC-FDMA signal has lower peak-to-average power ratio (PAPR) because of its inherent single carrier structure. SC-FDMA has drawn attention, including in connection with uplink communications where lower PAPR greatly benefits the mobile terminal in terms of transmit power efficiency. It is currently a working assumption for the uplink multiple access scheme in 3GPP Long Term Evolution (LTE), or Evolved UTRA.

Figure 1:
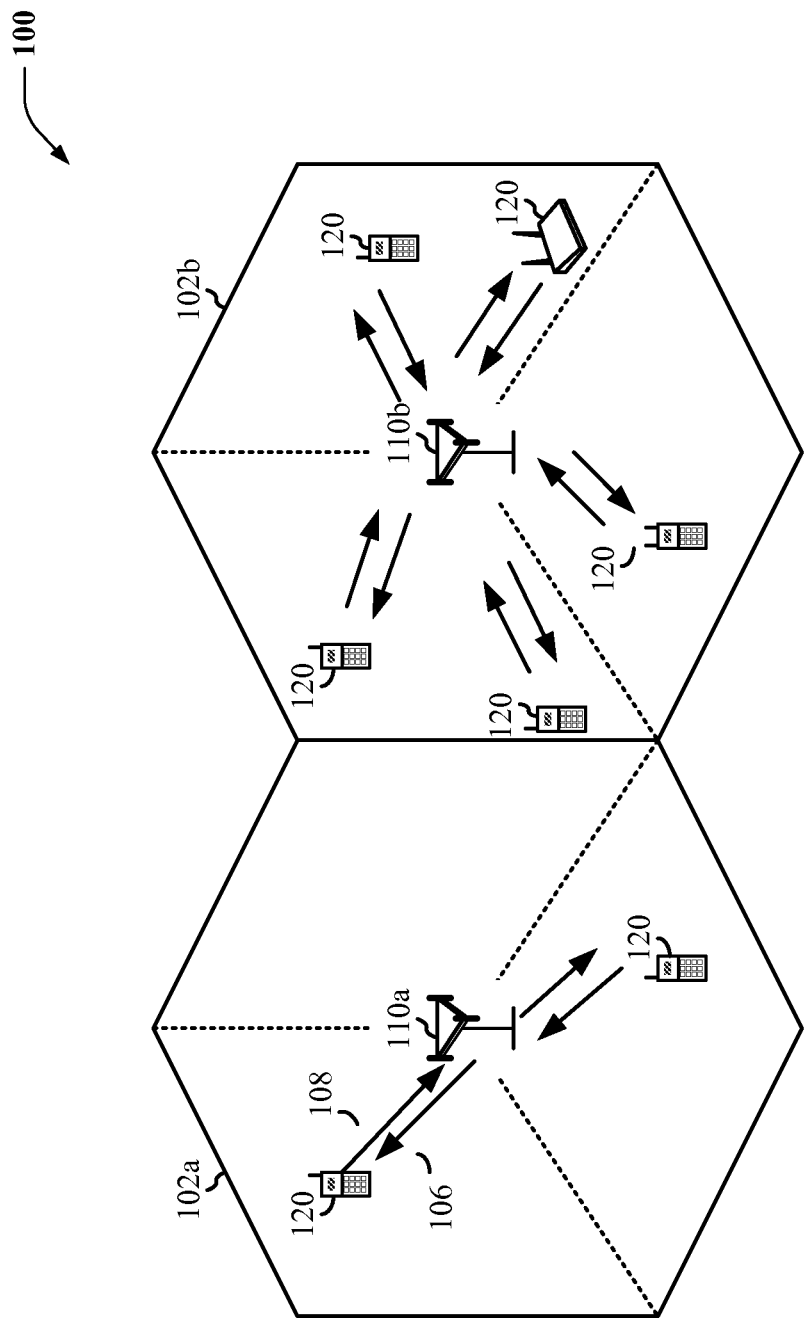
FIG. 1 illustrates a multiple access wireless communication system according to one or more aspects.

Referring now to FIG. 1, there is shown a multiple access wireless communication system 100 according to one or more non-limiting aspects of the present invention. In the illustrated case of FIG. 1, wireless communication system 100 include one or more base stations 110 in contact with one or more UEs 120. Each base station or access point 110a, 110b provides communication coverage for respective geographic area 102a or 102b. The term "cell" can refer to a base station and/or its coverage area depending on the context in which the term is used. In accordance with a more detailed but still non-limiting aspect, one or more of the base stations 110 can be Femto base stations installed to improve indoor connectivity for a few UEs 120. A UE 120 is in communication with the base station/eNode B/home evolved Node-B (HeNB) 110 that transmits information to UE 120 over forward link/downlink 106 and receives information from UE 120 over uplink/reverse link 108. The forward link (or downlink) refers to the communication link from the base stations to mobile devices, and the reverse link (or uplink) refers to the communication link from mobile devices to the base stations.

Where the base station 110 is a Femto base station, UE 120 may only be able to connect to the base station servicing its particular cell. Accordingly, a UE 120 in cell 102a can connect to HeNB 110a while UEs 120 in cell 102b can only connect to HeNB 110b. Since Femto networks are not generally planned and due to the smaller cell size associated with an HeNB 110, it may happen that a UE 120 in cell 102b is closer to HeNB 102a rather than its own serving eNode B 120b. As a result, interference for such a UE 120 being served by HeNB 102a may be created. Hence, a non-limiting aspect of the present invention relates to implementing a coordination mechanism between cells 102a and 102b within communication system 100 such that interference between neighboring cells is mitigated.

Distributed dynamic interference management in deployments like wireless Femto cells may rely on exchanging traffic priorities (possibly, in addition to channel states) between interfering cells. The traffic priorities are typically quantized using only a few bits. For delay sensitive flows, there is a natural quantization based on the delay targets. However, for best effort flows, the priority metric can have a large dynamic range (e.g., corresponding to the proportional fair log utilities).

Intuitively, there is no natural reference for quantization of priorities of best effort flows. For example, if most of the flows are serviced at 1 Mbps, then a flow at 1 Kbps should have a very high priority. However, if this reference is not known, then many flows may have high priorities; such that even though the relative prioritization between may be correct, the quantization may lead to all flows having the same high priority. The converse problem occurs if the reference is chosen too low—all flows have the same low priority.

In such cases, a distributed interference management algorithm may give higher preference to links which can obtain higher rates. Hence, these links may be scheduled most of the time, while other links which get lower rates will not be allocated any resources. Thus, the distributed dynamic interference management scheme would reduce to essentially an (approximation of) of a max-rate scheme with no notion of fairness.

Hence, a non-limiting aspect of the present invention relates to adaptation of the range of the priority metrics for attaining fairness in such a setting. Similarly, a notion of reference can be implemented for comparing priority of best effort flows against the priority of non best effort flows (e.g., assured forwarding, delay sensitive flows). Therefore, a common normalization constant can be used in a network neighborhood to quantize priorities of best effort traffic and to compare them with priorities of non-best effort traffic. Such a normalization rate/constant for prioritization of best effort traffic in Femto cell clusters can be determined in a distributed manner as detailed infra.

For example, traffic in a wireless communication environment may be prioritized by providing a quantized priority value for each of one or more data streams associated with a wireless communications node. A relative prioritization for each of the one or more data streams using the quantized priority values and one or more quantized priority values associated with one or more other wireless communications nodes may be determined. The quantized priority values associated with the wireless and other wireless communications nodes may be normalized with respect to a reference rate.

Figure 2A:
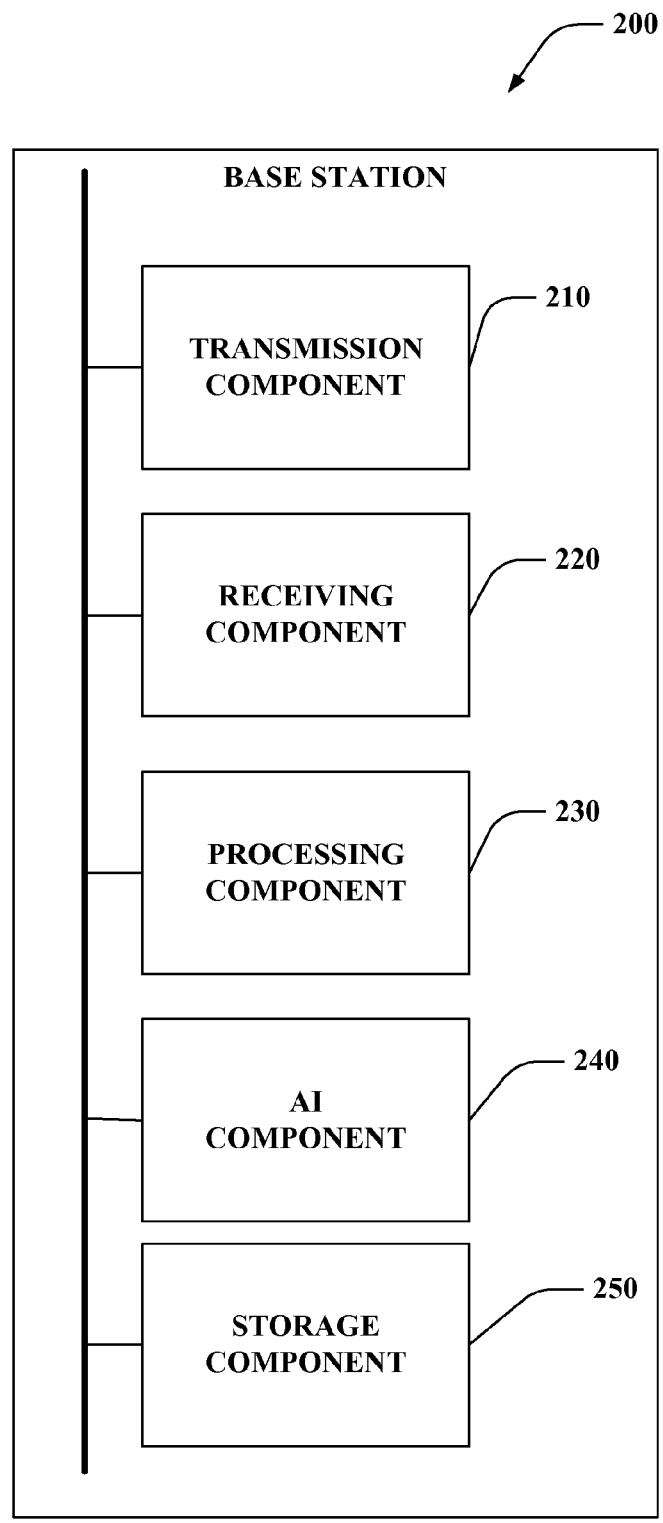
FIG. 2A illustrates a schematic diagram of a base station facilitating distributed interference management.

Referring to FIG. 2A, there is shown a schematic diagram 200 of a base station facilitating distributed interference management. The base station 200 can be a Femto base station facilitating indoor connectivity according to a more detailed yet non-limiting aspect of the present invention. In the illustrated case, base station 200 includes a transmission component 210 and a receiving component 220 for facilitating communication on the forward and reverse links. Additionally, base station 200 includes a processing component 230. In certain non-limiting aspects of the present invention, processing component 230 may serve to facilitate estimation of a normalization constant for a reference level that facilitates prioritization of various flows within the cell it services. In certain aspects, the reference level may be or approach an optimum reference level. While for delay sensitive flows there are predetermined parameters set up at connection time, best effort flows require a coordination mechanism distributed within a network to ensure smooth operation. The optimum reference level can be a dynamic value adapted to parameters such as loading and priority levels of different types of traffic. For example, if more of higher priority traffic is being loaded in the cell then the optimum reference level calculated by the processing component 230 would be higher and conversely if more of lower priority traffic is being loaded in the cell serviced by the eNB 200 then the optimum reference level would be lower.

A further non-limiting aspect of the present invention relates to calculating the reference level based on previous values of the optimum levels. In accordance with different aspects, an intra-cell reference value or an inter-cell reference value or a combination thereof can be calculated. For an intra-cell reference value, the prior values retrieved for the estimation can be related to reference levels implemented within a cell serviced by the eNode B 200. For an inter-cell reference value, the previous values of reference levels from the neighboring cells as obtained by the receiving component 220 can be obtained either dynamically or may be retrieved from the storage component 250. The number of values to be considered and the time periods for which the values should be retrieved for the reference level calculation can be selected via artificial intelligence techniques of the AI component 240. Various statistical techniques can be implemented for the calculation of reference levels from the previous values. As a means of illustration and not limitation, the current value for an optimum reference level can be an average of the previous values retrieved for the cell. Other aspects can relate to calculating the value as a median of values associated with specific time ranges or it can be a weighted average that considers weights of various parameters involved in the calculation. The new optimum reference level is implemented within the cell serviced by the eNB 200 and stored in the storage component 250 so that it can be employed for future reference level estimations. Moreover, the optimum reference level can be employed for determining a common normalization constant for prioritization of traffic in a cluster of neighboring cells. In LTE, the X2 or S1 interfaces between eNode Bs can be used for the purpose of exchange of estimates of average, for example. Alternatively, the exchange can be through an over-the-air channel. Hence, a low complexity scheme can be employed to compute a reference for priority functions across neighboring cells to manage interference in a distributed manner within various communication network environments ranging from Femto cells to wireless peer-to-peer networks.

According to certain non-limiting aspects of the present invention, the reference level may be determined in accordance with computations using the principles discussed in "Fast Linear Iterations for Distributed Averaging" by L. Xiao and S. Boyd, Systems and Controls Letters, Elsevier, 2004, the entire disclosure of which is hereby incorporated by reference herein.

Figure 2B:
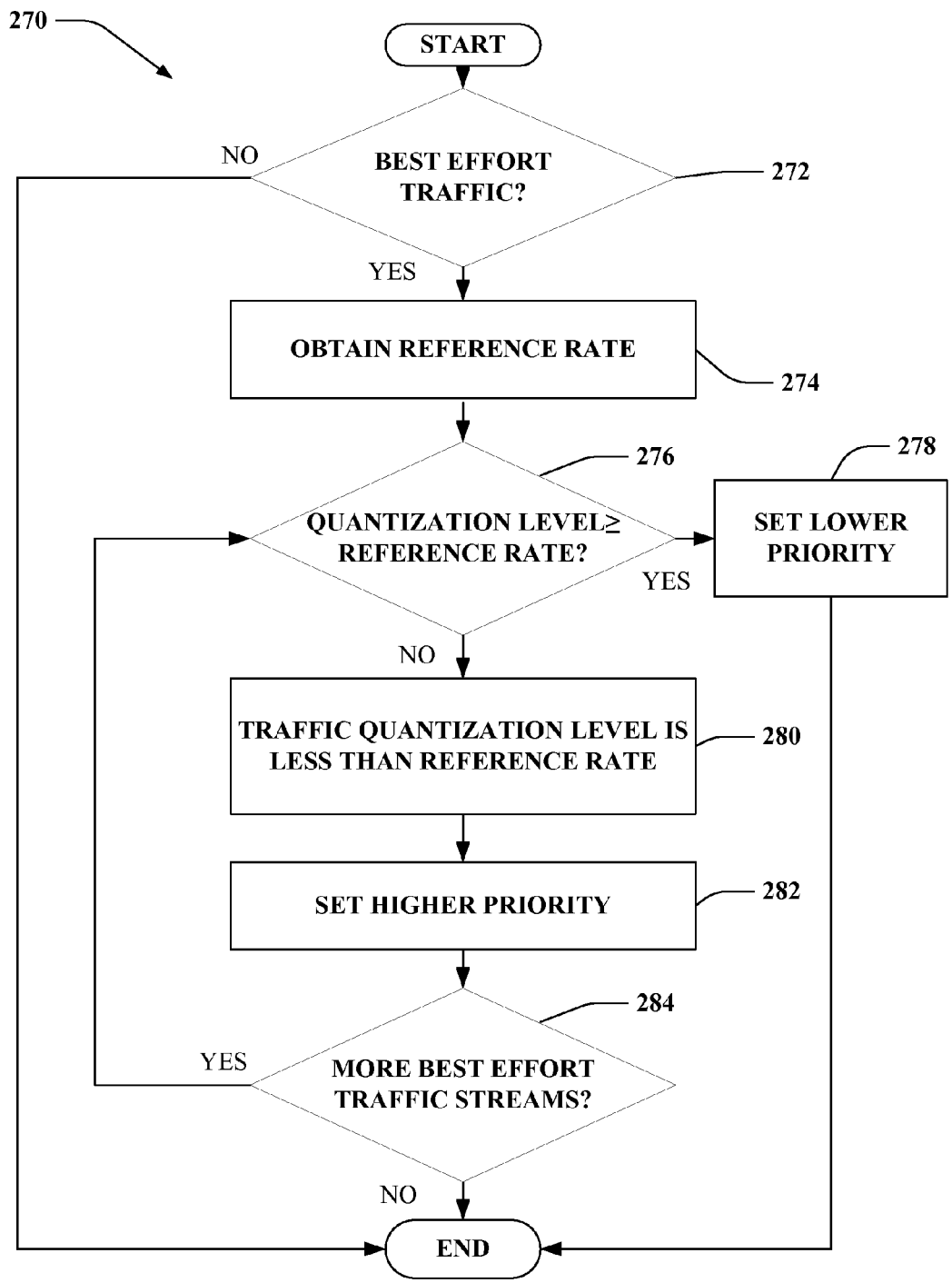
FIG. 2B illustrates a flow chart detailing a methodology for prioritization of best effort traffic employing a normalized constant estimated in accordance with different non-limiting aspects of the present invention.

FIG. 2B shows a flow-diagrammatic representation of a methodology 270 for prioritization of best effort traffic employing a normalized constant estimated in accordance with different non-limiting aspects of the present invention. The method begins at 272, wherein it is determined if there is best effort traffic for transmission within a cell. If yes, the method proceeds to 274 else it terminates on the end block. At 274, the eNode B servicing the cell obtains a reference rate for optimal prioritization of best effort traffic. At 276, for various each of the best effort traffic streams, it is determined if their quantization levels are greater than or equal to the reference rate. If yes, then a lower priority is set for such traffic streams as shown at 278 and the method terminates on the end block. If at 276, it is determined that the quantization level of a best effort traffic stream is not greater than or equal to the reference rate, then it is concluded at 280 that the quantization level of such a stream is less than the reference rate. Accordingly, a higher priority is set for such a traffic stream as shown at 282. At 284, it is determined if more best effort traffic streams need to be prioritized. If yes, the method iterates back to step 276 to continue prioritization else the method terminates on the end block.

Figure 2C:
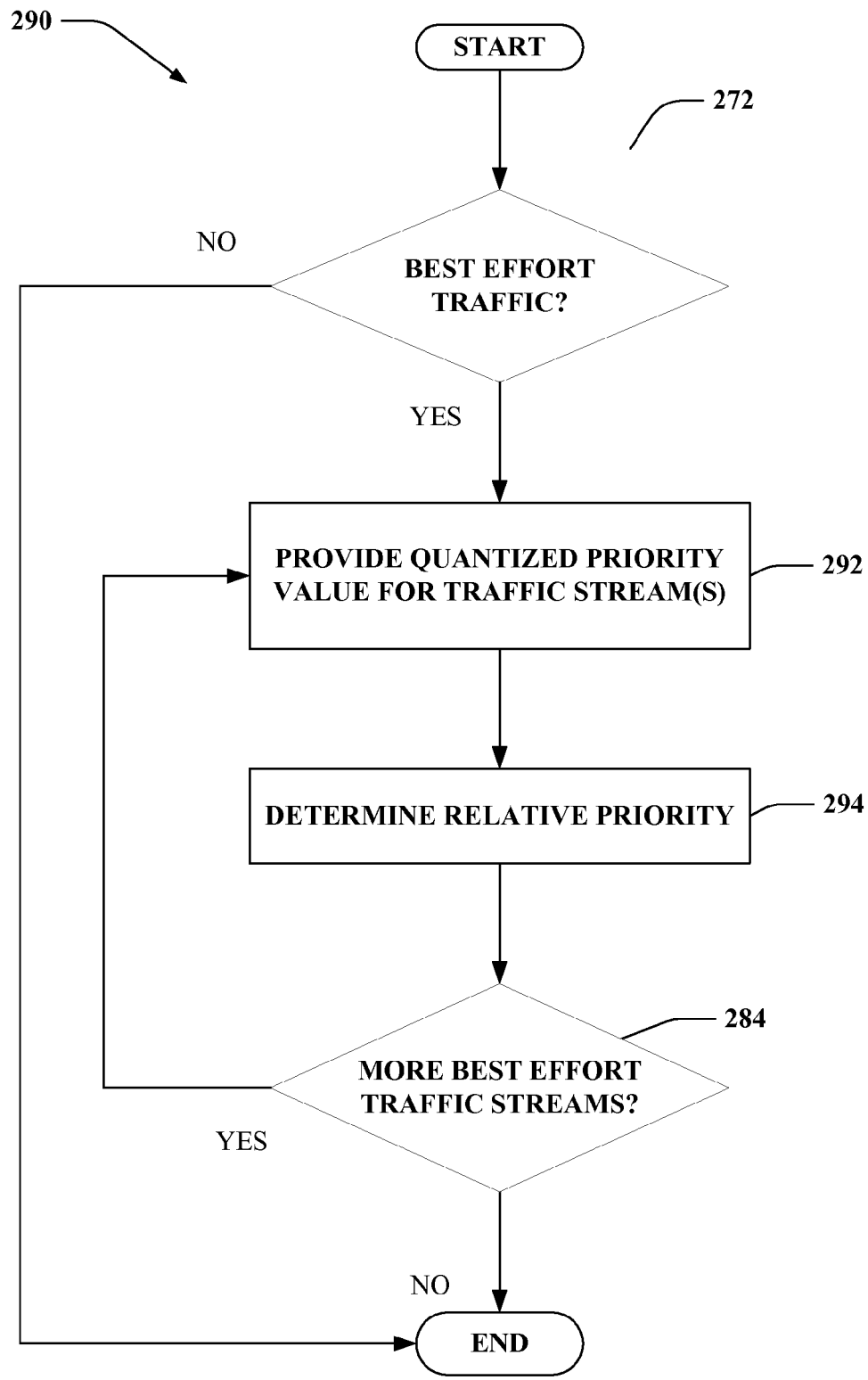
FIG. 2C illustrates a flow chart detailing a methodology for prioritization of best effort traffic employing a normalized constant estimated in accordance with different non-limiting aspects of the present invention.

FIG. 2C shows a flow diagrammatic representation of a methodology 290 according to a non-limiting aspect of the present invention. Method 290 may be suitable for prioritizing traffic in a wireless communication environment. In the illustrated case of FIG. 2C, method 290 further includes determining if there is best effort traffic for transmission within a cell at step 272. If yes, the method proceeds to step 292 else it terminates on the end block. A quantized priority value for each of one or more data streams associated with a wireless communications node is provided at step 292. A relative prioritization for each of the one or more data streams using the quantized priority values and one or more quantized priority values associated with one or more other wireless communications nodes is determined at step 294. In the illustrated case of FIG. 2C, the quantized priority values associated with the wireless and other wireless communications nodes may be normalized with respect to a reference rate.

In certain non-limiting aspects of the present invention, processing at step 292 may include determining a rate to be associated with the wireless communications node. For example, the determined rate may be the reference rate and be determined as otherwise discussed herein. The determined rate may be an intra-cell or inter-cell rate, for example.

In certain non-limiting aspects of the present invention, processing at step 292 may include determining a rate to be associated with the wireless communications node. For example, the determined rate may be the reference rate and be determined as discussed herein. In certain non-limiting aspects of the present invention, processing at step 292 may include determining a priority value based upon the determined rate and at least one parameter associated with the associated data stream, and quantizing the determined priority value. For example, a priority value associated with a data stream may be determined based upon the reference rate and a rate associated with the traffic stream.

In certain non-limiting aspects of the present invention, processing at block 292 may include determining a priority value using quantized parameters, such that a quantized priority value is directly determined and a separate later quantizing step is not used.

In certain non-limiting aspects of the present invention, the determined rate may be at least partially based upon communications rates associated with prior data streams associated with the wireless communications node. For example, the determined rate may be at least partially based upon an average of communications rates associated with prior data streams associated with the wireless communications node.

In certain non-limiting aspects of the present invention, the determined rate may in addition or in lieu thereof, be at least partially based upon an average of communications rates associated with prior data streams associated with the one or more other wireless communications nodes, in an analogous manner. In such a case, the methodology may include receiving the one or more quantized priority values associated with one or more other wireless communications nodes. At least one of the received quantized priority values may be directly received from the corresponding other wireless communications node. Additionally, or in lieu thereof, at least one of the received quantized priority values may be received from the corresponding other wireless communications node via an air interface. Additionally, or in lieu thereof, at least one of the received quantized priority values may be received from the corresponding other wireless communications node via an S1 interface. Additionally, or in lieu thereof, at least one of the received quantized priority values may be received from the corresponding other wireless communications node via an X2 interface. In certain non-limiting aspects of the present invention, the manner used to transmit and receive such information between nodes may be at least partially based upon data flow considerations. For example, more detailed, comprehensive and/or voluminous data may be better suited for provision using backhaul medium, S1 or X2 mechanism, while less detailed, more cursory and/or less voluminous data may be better suited for provision directly, such as via direct air interfaces.

In certain non-limiting aspects of the present invention, one or more of the wireless and other wireless communications nodes may take the form of or include wireless access points. In addition to or lieu thereof, one or more of the wireless and other wireless communications nodes may take the form of or include NodeB's and/or home evolved node, for example.

In certain non-limiting aspects of the present invention, processing at block 292 may include determining a rate to be associated with the wireless communications node; and determining channel gains for non best-effort traffic associated with the wireless communications node. Determining the channel gains may include determining resources needed to meet QoS requirements of the non-best effort traffic.

By way of further non-limiting example, processing associated with the methods of FIGS. 2B and 2C may be carried out via processing component 230 of FIG. 2A, in cooperating with AI and storage components 240, 250.

Figure 2D:
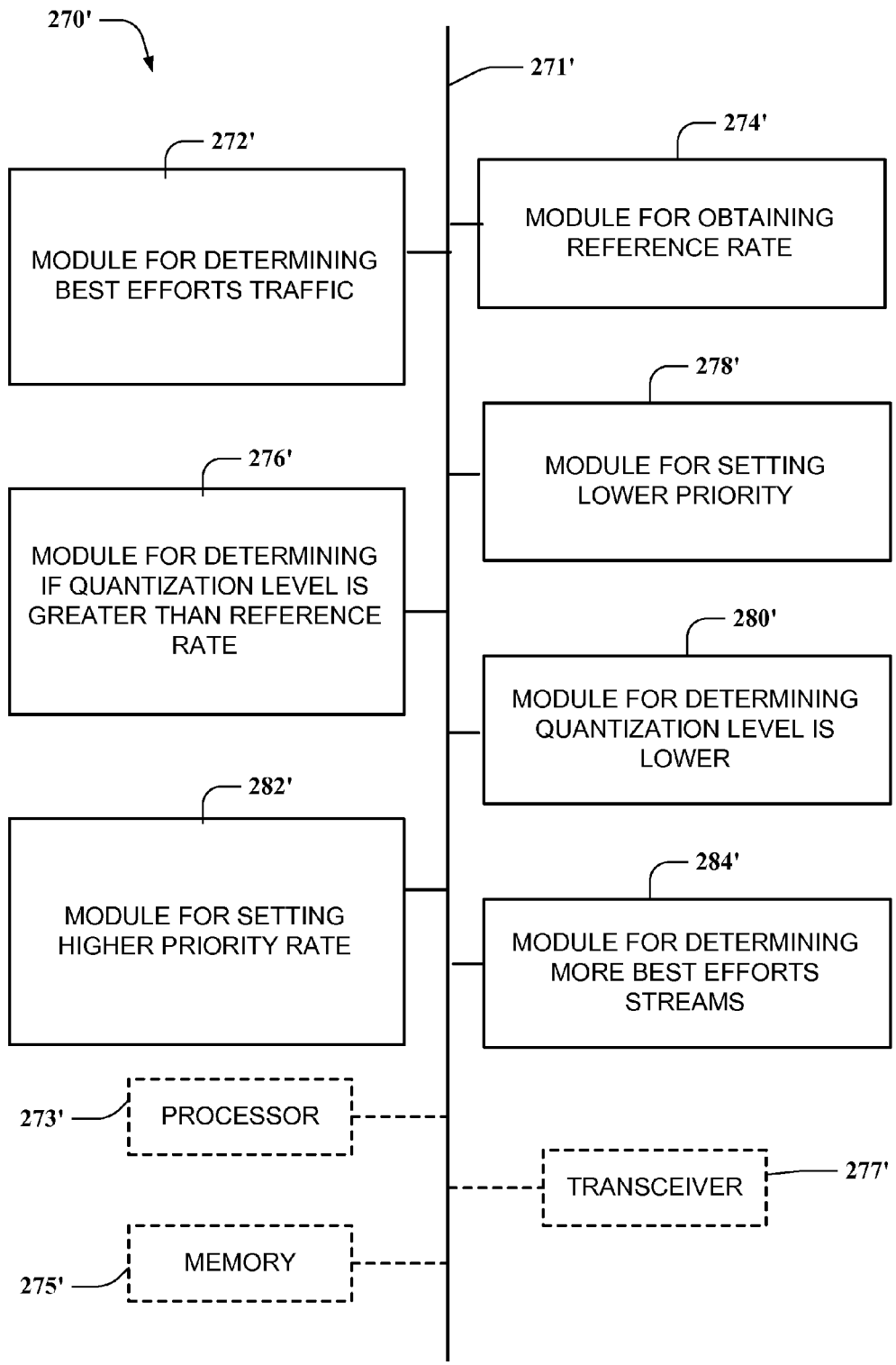
FIG. 2D illustrates a schematic diagram of an apparatus facilitating distributed interference management.

In accordance with one or more non-limiting aspects of the present invention, there may be provided devices and apparatuses for interference management. With reference to FIG. 2D, there is provided an exemplary apparatus 270' that may be configured as a communication device or as a processor or similar device for use within the communication device. As depicted, the apparatus 270' may include functional blocks that can represent functions implemented by a processor, software, or combination thereof (e.g., firmware).

As illustrated, apparatus 270' may comprise an electrical component or the module 272' for determining if there is best effort traffic for transmission within a cell. Apparatus 270' may comprise an electrical component or the module 274' obtains a reference rate for optimal prioritization of best effort traffic. Apparatus 270' may comprise an electrical component or the module 276' for, various each of the best effort traffic streams, determining if their quantization levels are greater than or equal to the reference rate. Apparatus 270' may comprise an electrical component or the module 278' for setting a lower priority for such traffic streams. Apparatus 270' may comprise an electrical component or the module 280' for determining that the quantization level of such a stream is less than the reference rate. Apparatus 270' may comprise an electrical component or the module 282' for setting a higher priority for such a traffic stream. Apparatus 270' may comprise an electrical component or the module 284' for determining if more best effort traffic streams need to be prioritized.

It is noted apparatus 270' may optionally include a processor module 273' having at least one processor, in the case of the apparatus 270' configured as a communication network entity, rather than as a processor. The processor 273', in such case, may be in operative communication with the modules 272', 274', 276', 278', 280', 282' and 284' via a bus 271' or similar communication coupling. The processor 273' may effect initiation and scheduling of the processes or functions performed by electrical components 272', 274', 276', 278', 280', 282' and 284'.

In related non-limiting aspects of the present invention, apparatus 270' may include a transceiver module 277'. A stand alone receiver and/or stand alone transmitter may be used in lieu of or in conjunction with the transceiver 275'. In further related aspects, the apparatus 270' may optionally include a module for storing information, such as, for example, a memory device/module 275'. The computer readable medium or the memory module 275' may be operatively coupled to the other components of the apparatus 270' via the bus 271' or the like. The memory module 275' may be adapted to store computer readable instructions and data for effecting the processes and behavior of the modules 272', 274', 276', 278', 280', 282' and 284', and subcomponents thereof, or the processor 273', or the methods disclosed herein. The memory module 275' may retain instructions for executing functions associated with the modules 272', 274', 276', 278', 280', 282' and 284'. While shown as being external to the memory 275', it is to be understood that the modules 272', 274', 276', 278', 280', 282' and 284' can exist within the memory 275'. In certain non-limiting aspects of the present invention the functionalities of one or more of modules 272', 274', 276', 278', 280', 282' and 284' can be combined or further separated.

Figure 2E:
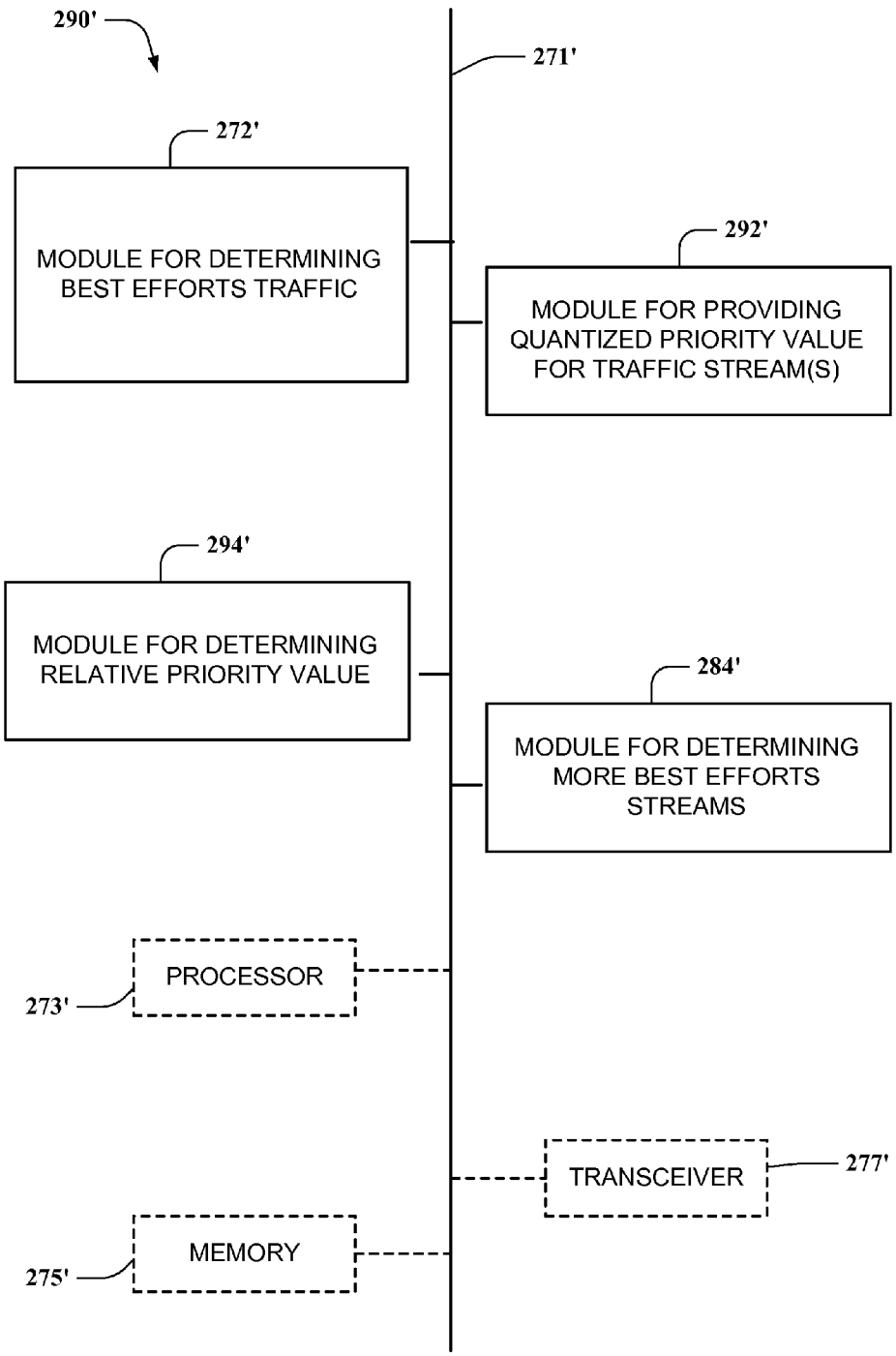
FIG. 2E illustrates a schematic diagram of an apparatus facilitating distributed interference management.

In accordance with one or more non-limiting aspects of the present invention, there may be provided devices and apparatuses for interference management. With reference to FIG. 2E, there is provided an exemplary apparatus 290' that may be configured as a communication device or as a processor or similar device for use within the communication device. As depicted, the apparatus 290' may include functional blocks that can represent functions implemented by a processor, software, or combination thereof (e.g., firmware).

As illustrated, apparatus 290' may comprise an electrical component or the module 272' for determining if there is best effort traffic for transmission within a cell. If yes, the method proceeds to step 292 else it terminates on the end block. Apparatus 290' may comprise an electrical component or the module 292' for providing a quantized priority value for each of one or more data streams associated with a wireless communications node. Apparatus 290' may comprise an electrical component or the module 294' for providing a relative prioritization for each of the one or more data streams using the quantized priority values and one or more quantized priority values associated with one or more other wireless communications nodes. In the illustrated case of FIG. 2E, the quantized priority values associated with the wireless and other wireless communications nodes may be normalized with respect to a reference rate. Apparatus 290' may comprise an electrical component or the module 284' for determining if more best effort traffic streams need to be prioritized.

In certain non-limiting aspects of the present invention, module 292' may be for determining a rate to be associated with the wireless communications node. For example, the determined rate may be the reference rate and be determined as otherwise discussed herein. The determined rate may be an intra-cell or inter-cell rate, for example.

In certain non-limiting aspects of the present invention, module 292' may be for determining a rate to be associated with the wireless communications node. For example, the determined rate may be the reference rate and be determined as discussed herein. In certain non-limiting aspects of the present invention, module 292' may be for determining a priority value based upon the determined rate and at least one parameter associated with the associated data stream, and quantizing the determined priority value. For example, a priority value associated with a data stream may be determined based upon the reference rate and a rate associated with the traffic stream.

In certain non-limiting aspects of the present invention, module 292' may be for determining a priority value using quantized parameters, such that a quantized priority value is directly determined and a separate later quantizing step is not used.

It is noted apparatus 290' may optionally include a processor module 273' having at least one processor, in the case of the apparatus 290' configured as a communication network entity, rather than as a processor. The processor 273', in such case, may be in operative communication with the modules 272', 292', 294', 284' via a bus 271' or similar communication coupling. The processor 273' may effect initiation and scheduling of the processes or functions performed by electrical components 272', 292', 294', 284'.

In related non-limiting aspects of the present invention, apparatus 290' may include a transceiver module 277'. A stand alone receiver and/or stand alone transmitter may be used in lieu of or in conjunction with the transceiver 275'. In further related aspects, the apparatus 290' may optionally include a module for storing information, such as, for example, a memory device/module 275'. The computer readable medium or the memory module 275' may be operatively coupled to the other components of the apparatus 270' via the bus 271' or the like. The memory module 275' may be adapted to store computer readable instructions and data for effecting the processes and behavior of the modules 272', 292', 294', 284', and subcomponents thereof, or the processor 273', or the methods disclosed herein. The memory module 275' may retain instructions for executing functions associated with the modules 272', 292', 294', 284'. While shown as being external to the memory 275', it is to be understood that the modules 272', 292', 294', 284' can exist within the memory 275'. In certain non-limiting aspects of the present invention the functionalities of one or more of modules 272', 292', 294', 284' can be combined or further separated.

Figure 3:
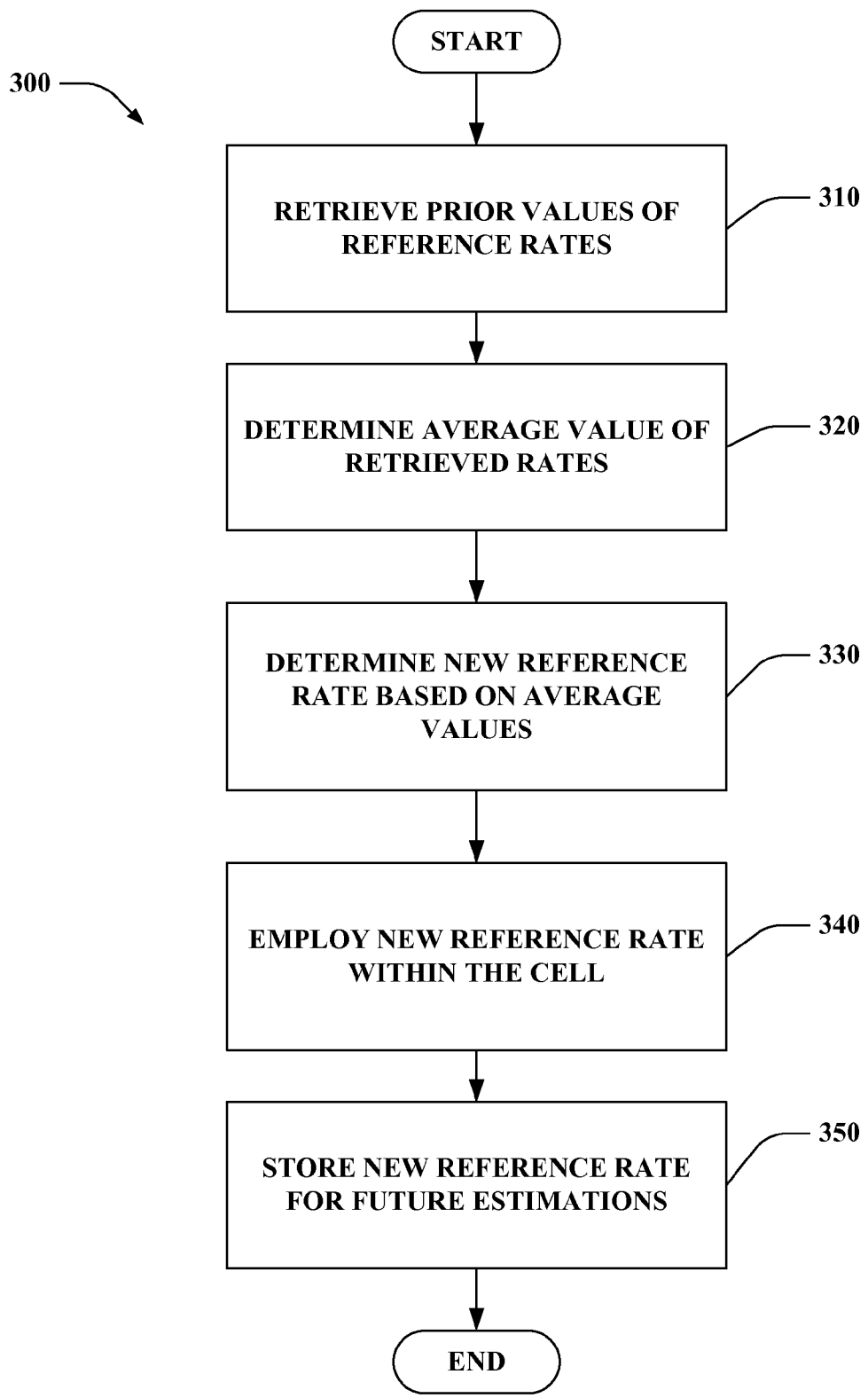
FIG. 3 illustrates a flow chart detailing a method of estimating a reference value for setting priorities of best effort flows in accordance with a non-limiting aspect of the present invention.

FIG. 3 shows a flow diagrammatic representation of a method 300 of estimating a reference value for setting priorities of best effort flows in accordance with a non-limiting aspect of the present invention. The method begins at 310 wherein previous values of reference rates for different time periods are retrieved. As discussed supra, the range of time periods and the times for which to retrieve the values can be predetermined or can be selected dynamically via various artificial intelligence techniques. At 320, an average of the previous reference rates is determined. At 330, the average value is employed for determining a new reference rate for the cell. Further non-limiting aspects of the present invention can relate to including average rates obtained from other neighboring base stations into the calculation of the new reference rates. Additionally, different statistical techniques may be applied for determining the new reference rate from the previous rates. For example a weighted average can be used for different time ranges etc. for estimation of the new reference rate. The new reference rate is employed for use within the cell as shown at 340 and also stored for future reference estimations as show at 350. Thus, a closed loop manner of using feedback from previous allocations at different times can be employed for calculating a current reference rate.

Figure 4:
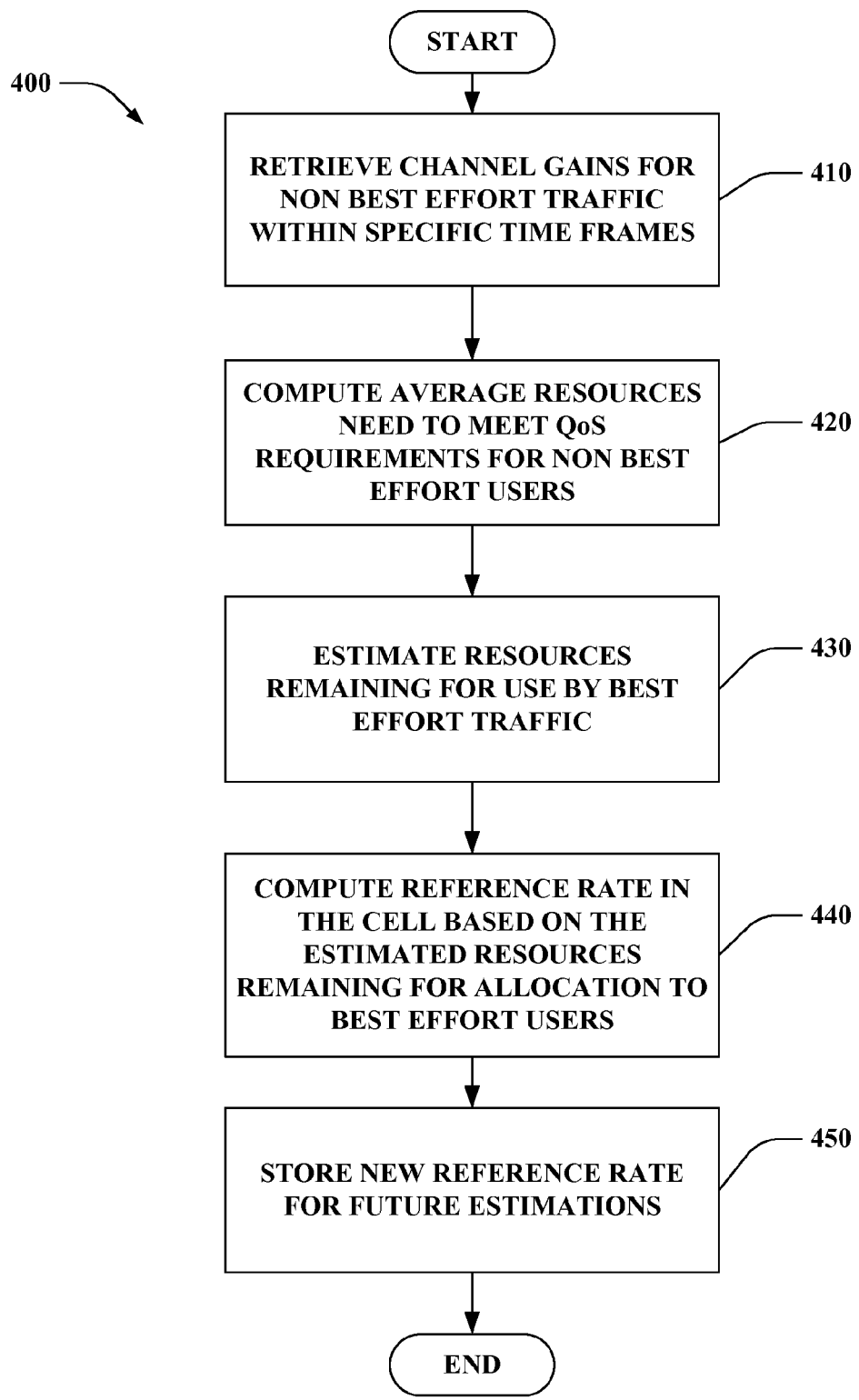
FIG. 4 illustrates a flow chart detailing another methodology of estimating reference rate in a cell based on estimation of channel gains for non best effort traffic within a cell according to a non-limiting aspect of the present invention.

FIG. 4 shows a flow diagrammatic representation of another method 400 of estimating reference rate in a cell based on estimation of channel gains for non best effort traffic within a cell. The method commences at 410, wherein channel gains for non-best effort traffic such as delay sensitive flows are retrieved for specified time frames. As discussed supra, the times periods at which to retrieve the channel gains can either be predetermined or selected dynamically. At 420, average resources needed to meet the QoS requirements, for example, rate/delay guarantees for non-best effort users are computed. At 430, from the total resources available within the cell, the resources remaining for use of best effort users are estimated. At 440, the reference rate in the cell is computed based at least on the resources remaining for allocation to the best effort traffic. A further aspect can also relate to taking into consideration the reference rates obtained from neighboring cells for calculation of the new reference rate. At 450, the new reference rate is stored for future calculations. Therefore the reference rate in a cell can thus be computed using the average channel gains for non-best effort users assuming that the distribution of the remaining resources to best effort users occurs at a fair level.

Figure 5:
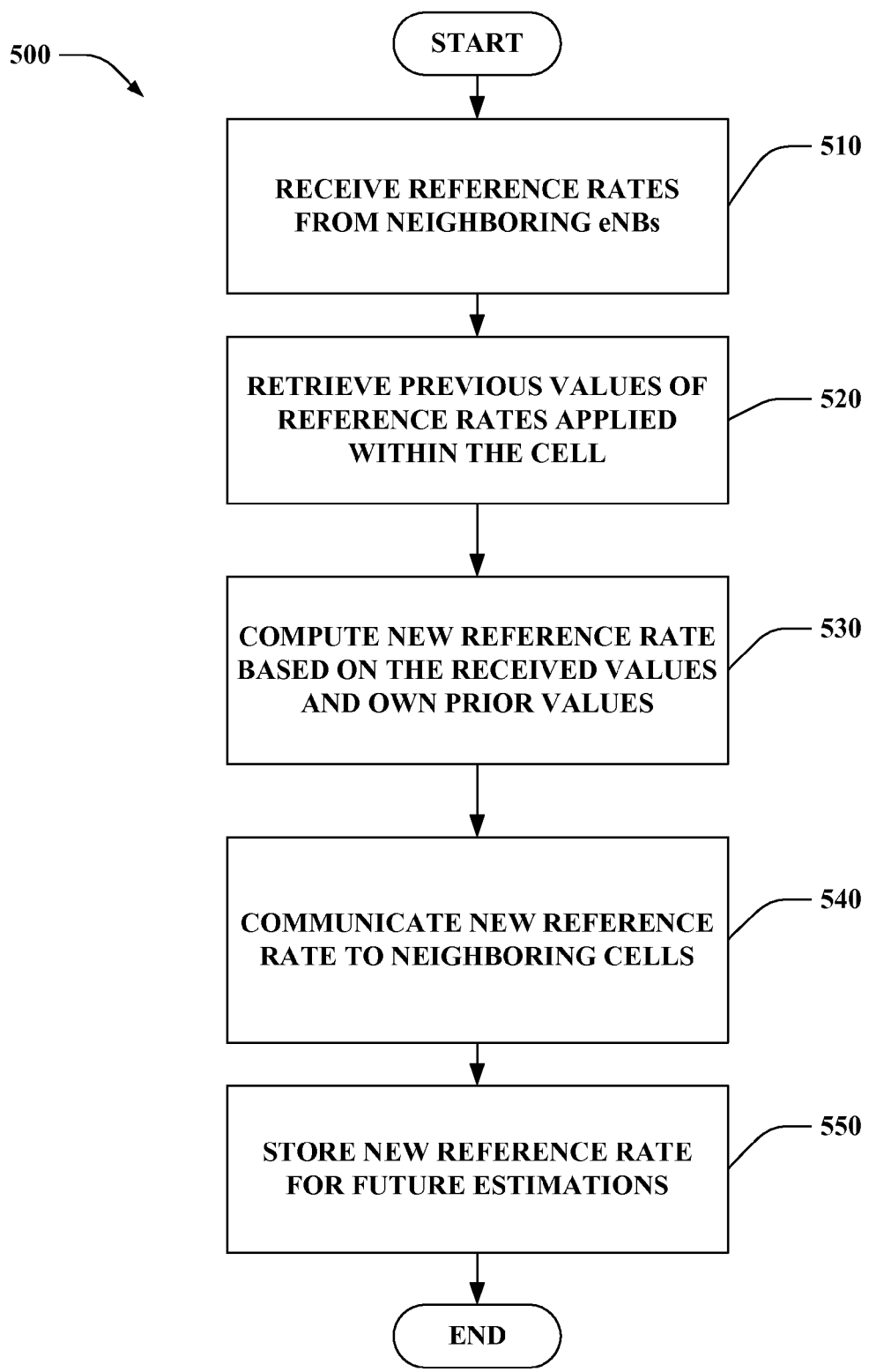
FIG. 5 illustrates a flow chart detailing a methodology of estimating references rates within a cell according to a non-limiting aspect of the present invention.

FIG. 5 shows a flow diagrammatic representation of another method 500 of estimating references rates within a cell. The method begins at step 510 wherein reference rates are received at a eNode B from one or more neighboring eNode Bs. Various non-limiting aspects of the present invention relate to receiving reference rates from neighboring cells on a periodic basis and/or an event driven basis. The times for transmitting rates to and/or retrieving reference rates from neighboring eNode Bs can be determined via various artificial intelligence techniques that can be implemented within a communication system. At step 520, previous values of reference rates that were implemented within a cell served by the eNode B are retrieved from storage. For example, an average value of prior reference rates can be retrieved for calculation of a new reference rate. At 530, a new reference rate is computed for prioritization of best effort flows based on the retrieved values implemented by the eNode B within its own cell along with those received from the neighboring eNode Bs. At 540, the new reference rate can be communicated to neighboring eNode Bs and is also stored for future calculations as shown at 550. Thus each eNode B computes its estimate of the average reference rate as a function of the estimates of the average rates communicated by its neighbors and its own estimate of the reference rate. Although it is described that each eNode B estimates its reference rate based on received and/or own retrieved reference rates, it can be appreciated that a central controller can be managing a plurality of eNode Bs. The controller can therefore act as central processor for these calculations and communicate the values to the eNode Bs being managed. In certain non-limiting aspects of the present invention, one or more of the eNode B's may take the role of the central controller.

By way of further non-limiting example, processing associated with the methods of FIGS. 2B-5 may be carried out via processing component 230 of FIG. 2A, in cooperating with AI and storage components 240, 250.

Figure 6:
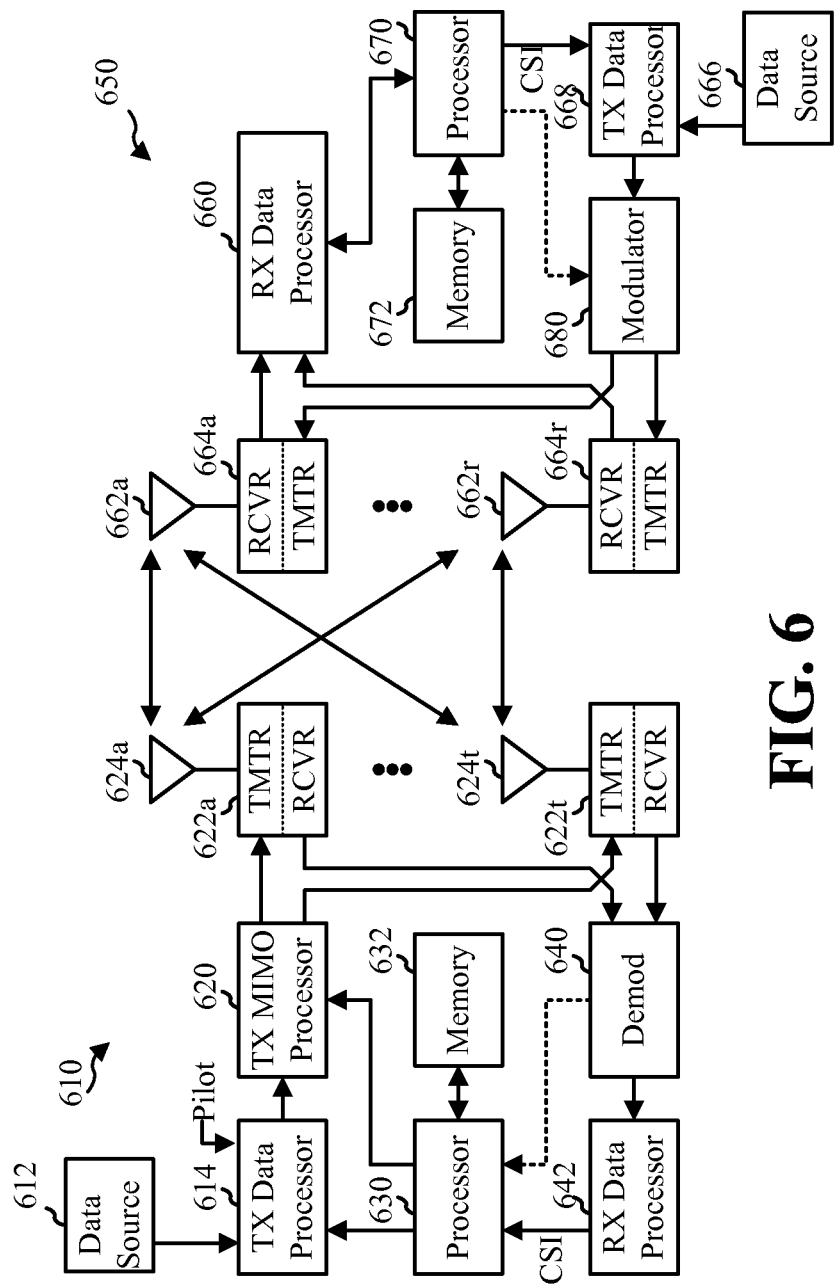
FIG. 6 illustrates is a block diagram of an embodiment of a transmitter system and a receiver system in a MIMO system according to a non-limiting aspect of the present invention. And, FIG. 7 illustrates a multiple access wireless communication system according to a non-limiting aspect of the present invention.

FIG. 6 illustrates a block diagram 600 of an embodiment of a transmitter system 610 (also known as the access point or base station or eNode B) and a receiver system 650 (also known as access terminal or user equipment) in a MIMO system 600. At the transmitter system 610, traffic data for a number of data streams is provided from a data source 612 to a transmit (TX) data processor 614.

In certain non-limiting aspects of the present invention, each data stream is transmitted over a respective transmit antenna. TX data processor 614 formats, codes and interleaves the traffic data for each data stream based on a particular coding scheme selected for that data stream to provide coded data.

The coded data for each data stream may be multiplexed with pilot data using OFDM techniques, for example. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding and modulation for each data stream may be determined by instructions performed by processor 630.

The modulation symbols for the data streams are then provided to a TX MIMO processor 620, which may further process the modulation symbols (e.g., for OFDM). TX MIMO processor 620 then provides NT modulation symbol streams to NT transmitters (TMTR) 666a through 666t. In certain non-limiting aspects of the present invention, TX MIMO processor 620 may apply beamforming weights to the symbols of the data streams and to the antenna from which the symbol is being transmitted.

Each transmitter 622 receives and processes a respective symbol stream to provide one or more analog signals, and further conditions (e.g., amplifies, filters, and up-converts) the analog signals to provide a modulated signal suitable for transmission over the MIMO channel. NT modulated signals from transmitters 622a through 622t are then transmitted from NT antennas 624a through 624t, respectively.

At receiver system 650, the transmitted modulated signals are received by NR antennas 662a through 662r and the received signal from each antenna 662 is provided to a respective receiver (RCVR) 664a through 664r. Each receiver 664 conditions (e.g., filters, amplifies, and down-converts) a respective received signal, digitizes the conditioned signal to provide samples, and further processes the samples to provide a corresponding "received" symbol stream.

An RX data processor 660 then receives and processes the NR received symbol streams from NR receivers 664 based on a particular receiver processing technique to provide NT "detected" symbol streams. The RX data processor 660 then demodulates, de-interleaves and decodes each detected symbol stream to recover the traffic data for the data stream. The processing by RX data processor 660 is complementary to that performed by TX MIMO processor 668 and TX data processor 614 at transmitter system 610. Processor 670 formulates a reverse link messages in accordance with different aspects discussed herein.

The reverse link message may comprise various types of information regarding the communication link and/or the received data stream. The reverse link message is then processed by a TX data processor 668 which processing can be based on instructions stored in memory 672, which also stores traffic data for a number of data streams from a data source 666, modulated by a modulator 680, conditioned by transmitters 664a through 664r, and transmitted back to transmitter system 610.

At transmitter system 610, the modulated signals from receiver system 660 are received by antennas 624, conditioned by receivers 622, demodulated by a demodulator 640 and processed by a RX data processor 642 to extract message transmitted by the system 610. Processor 630 then processes the extracted message based on information in the message or instructions retrieved from the memory 632.

By way of further non-limiting example, processing associated with the methods of FIGS. 2B-5 may be carried out via processor 630 of FIG. 6, in cooperating with the other components shown therein.

Figure 7:
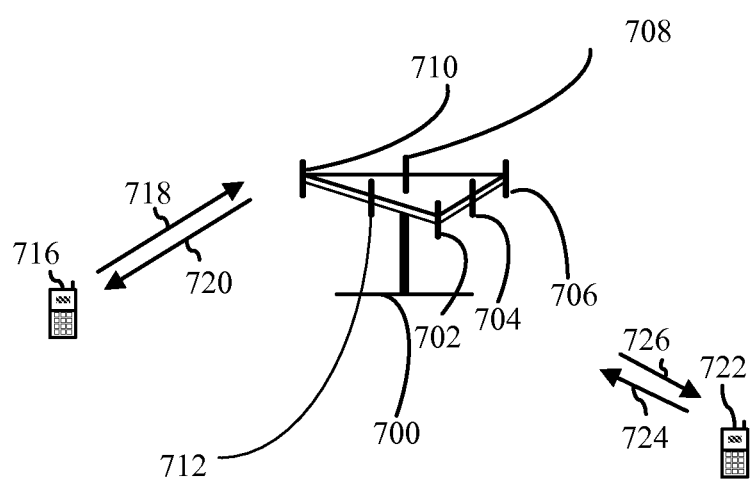

Referring to FIG. 7, a multiple access wireless communication system according to a non-limiting aspect of the present invention is illustrated. An Node B 700 includes multiple antenna groups, one including 702 and 704, another including 706 and 708, and an additional including 710 and 712. In FIG. 7, only two antennas are shown for each antenna group, however, more or fewer antennas may be utilized for each antenna group. User Equipment 716 (UE) is in communication with antennas 710 and 712, where antennas 710 and 712 transmit information to access terminal 716 over forward link 720 and receive information from Node B 700 over reverse link 718. User Equipment 722 is in communication with antennas 706 and 708, where antennas 706 and 708 transmit information to Node B 700 over forward link 726 and receive information from Node B 700 over reverse link 724. In a FDD system, communication links 718, 720, 724 and 726 may use different frequency for communication. For example, forward link 720 may use a different frequency then that used by reverse link 718.

Each group of antennas and/or the area in which they are designed to communicate is often referred to as a sector of the access point/base station. In certain non-limiting aspects of the present invention, antenna groups each are designed to communicate to access terminals in a sector, of the areas covered by Node B/access point/base station 700 (AP/BS).

In communication over forward links 720 and 726, the transmitting antennas of access Node B 700 may utilize beamforming in order to improve the signal-to-noise ratio of forward links for the different User Equipment 716 and 722. Also, a Node B using beamforming to transmit to UEs scattered randomly through its coverage causes less interference to UEs in neighboring cells than a Node B transmitting through a single antenna to all its UEs.

A Node B may be a fixed station used for communicating with the terminals and may also be referred to as an access point, a base station, or some other terminology. An access terminal may also be called user equipment (UE), a wireless communication device, terminal, or some other terminology.

In a non-limiting aspect of the present invention, logical channels are classified into Control Channels and Traffic Channels. Logical Control Channels comprise a Broadcast Control Channel (BCCH), which is a DL channel for broadcasting system control information. A Paging Control Channel (PCCH), which is a DL channel that transfers paging information, may also be included. A Multicast Control Channel (MCCH), which is a Point-to-multipoint DL channel used for transmitting Multimedia Broadcast and Multicast Service (MBMS) scheduling and control information for one or several Matches, may also be included. Generally, after establishing an RRC connection, this channel may only used by UEs that receive MBMS. A Dedicated Control Channel (DCCH), which is a Point-to-point bi-directional channel that transmits dedicated control information and used by UEs having an RRC connection, may be included. According to a non-limiting aspect of the present invention, Logical Traffic Channels may include a Dedicated Traffic Channel (DTCH), which is a Point-to-point bi-directional channel, dedicated to one UE, for the transfer of user information. Also, a Multicast Traffic Channel (MTCH) for Point-to-multipoint DL channel for transmitting traffic data may be included.

According to a non-limiting aspect of the present invention, Transport Channels are classified into DL and UL. DL Transport Channels include a Broadcast Channel (BCH), Downlink Shared Data Channel (DL-SDCH) and a Paging Channel (PCH), the PCH for support of UE power saving (DRX cycle is indicated by the network to the UE), broadcasted over entire cell and mapped to PHY resources which can be used for other control/traffic channels. The UL Transport Channels include a Random Access Channel (RACH), a Request Channel (REQCH), an Uplink Shared Data Channel (UL-SDCH) and plurality of PHY channels. The PHY channels include a set of DL channels and UL channels.

According to a non-limiting aspect of the present invention, a channel structure may be provided that preserves a low PAR (at any given time, the channel is contiguous or uniformly spaced in frequency) properties of a single carrier waveform.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure.

In certain aspects of the present invention non-backward compatible carriers can be used to assist time tracking and configuration restriction.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

What is claimed is:

1. A method for prioritizing traffic in a wireless communication environment, comprising:
    providing a quantized priority value for each of one or more data streams associated with a wireless communications node; and
    determining a relative prioritization for each of the one or more data streams using the quantized priority values and one or more quantized priority values associated with one or more other wireless communications nodes;
    wherein, the quantized priority values associated with the wireless and other wireless communications nodes are normalized with respect to a reference rate.

2. The method of claim 1, wherein the one or more data streams are best efforts-type data streams.

3. The method of claim 1, wherein the one or more data streams are best efforts-type data streams amongst other types of data streams.

4. The method of claim 1, wherein the providing the quantized priority value comprises determining the reference rate.

5. The method of claim 4, wherein the providing the quantized priority value further comprises determining a priority value based upon the determined rate and at least one parameter associated with at least one of the one or more data streams.

6. The method of claim 4, wherein the providing the quantized priority value further comprises:
    determining a priority value based upon the determined rate and at least one parameter associated with at least one of the one or more data streams; and
    quantizing the determined priority value.

7. The method of claim 4, wherein the determined rate is at least partially based upon communications rates associated with prior data streams associated with the wireless communications node.

8. The method of claim 4, wherein the determined rate is at least partially based upon an average of communications rates associated with prior data streams associated with the wireless communications node.

9. The method of claim 4, wherein the determined rate is at least partially based upon an average of communications rates associated with prior data streams associated with at least one of the one or more other wireless communications nodes.

10. The method of claim 1, wherein the reference rate is associated with the wireless and other wireless communications nodes.

11. The method of claim 1, further comprising receiving the one or more quantized priority values associated with one or more of the other wireless communications nodes.

12. The method of claim 11, wherein at least one of the received quantized priority values is directly received from at least one of the other wireless communications node.

13. The method of claim 11, wherein at least one of the received quantized priority values is received from at least one of the other wireless communications node via an air interface.

14. The method of claim 11, wherein at least one of the received quantized priority values is received from at least one of the other wireless communications node via an S1 interface.

15. The method of claim 11, wherein at least one of the received quantized priority values is received from at least one of the other wireless communications node via an X2 interface.

16. The method of claim 1, wherein one or more of the wireless and other wireless communications nodes are wireless access points.

17. The method of claim 1, wherein one or more of the wireless and other wireless communications nodes are home evolved nodes.

18. The method of claim 1, wherein the reference rate is associated with the wireless communications node.

19. The method of claim 18, wherein the reference rate is also associated with at least one of the other wireless communications nodes.

20. The method of claim 1, wherein the providing the quantized priority value comprises determining at least one resource to meet one or more QoS parameters for non best-effort traffic associated with the wireless communications node.

21. The method of claim 20, wherein the determining the at least one resource comprises determining one or more channel gains for the non-best effort traffic.

22. A wireless communications node, comprising at least one processor configured to:
    provide a quantized priority value for each of one or more data streams associated with the node; and
    determine a relative prioritization for each of the one or more data streams using the quantized priority values and one or more quantized priority values associated with one or more other wireless communications nodes;
    wherein, the quantized priority values associated with the wireless and other wireless communications nodes are normalized with respect to a reference rate.

23. The node of claim 22, wherein the one or more data streams are best efforts-type data streams amongst other types of data streams.

24. The node of claim 22, wherein the providing the quantized priority value comprises determining the reference rate.

25. The node of claim 24, wherein the providing the quantized priority value further comprises determining a priority value based upon the determined rate and at least one parameter associated with at least one of the data streams.

26. The node of claim 24, wherein the providing the quantized priority value further comprises:
    determining a priority value based upon the determined rate and at least one parameter associated with at least one of the data streams; and
    quantizing the determined priority value.

27. The node of claim 24, wherein the determined rate is at least partially based upon communications rates associated with prior data streams associated with the wireless communications node.

28. The node of claim 22, further comprising at least one receiver configured to receive the one or more quantized priority values associated with one or more of the other wireless communications nodes.

29. The node of claim 22, wherein the node is configured to receive at least one of the received quantized priority values via an S1 interface.

30. The node of claim 22, wherein the node is configured to receive at least one of the received quantized priority values via an X2 interface.

31. The node of claim 22, wherein the providing the quantized priority value comprises determining at least one resource to meet one or more QoS parameters for non best-effort traffic associated with the wireless communications node.

32. The node of claim 31, wherein the determining the resource comprises determining one or more channel gains for the non-best effort traffic.

33. A non-transitory computer-readable medium having instructions stored thereon, the instructions comprising:
    instructions for providing a quantized priority value for each of one or more data streams associated with a wireless communications node; and
    instructions for determining a relative prioritization for each of the one or more data streams using the quantized priority values and one or more quantized priority values associated with one or more other wireless communications nodes;
    wherein, the quantized priority values associated with the wireless and other wireless communications nodes are normalized with respect to a reference rate.

34. A system for prioritizing traffic in a wireless communication environment, comprising:
    means for providing a quantized priority value for each of one or more data streams associated with a wireless communications node, and determining a relative prioritization for each of the one or more data streams using the quantized priority values and one or more quantized priority values associated with one or more other wireless communications nodes, wherein, the quantized priority values associated with the wireless and other wireless communications nodes are normalized with respect to a reference rate; and
    means for transmitting one or more signals in accordance with one or more of the determined relative prioritizations.

* * * * *